(12) United States Patent
Jeong et al.

(10) Patent No.: US 9,713,191 B2
(45) Date of Patent: Jul. 18, 2017

(54) METHOD AND APPARATUS FOR SUPPORTING LOCAL ACCESS AND VOICE COMMUNICATION IN A LOCAL NETWORK

(71) Applicant: Samsung Electronics Co., Ltd., Suwon-si, Gyeonggi-do (KR)

(72) Inventors: Sang-Soo Jeong, Suwon-si (KR); Jung-Je Son, Yongin-si (KR); Song-Yean Cho, Seoul (KR); Beom-Sik Bae, Suwon-si (KR); Han-Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 206 days.

(21) Appl. No.: 14/348,374

(22) PCT Filed: Sep. 28, 2012

(86) PCT No.: PCT/KR2012/007970
§ 371 (c)(1),
(2) Date: Mar. 28, 2014

(87) PCT Pub. No.: WO2013/048219
PCT Pub. Date: Apr. 4, 2013

(65) Prior Publication Data
US 2014/0226568 A1 Aug. 14, 2014

(30) Foreign Application Priority Data
Sep. 29, 2011 (KR) .................. 10-2011-0099421

(51) Int. Cl.
*H04W 4/00* (2009.01)
*H04W 76/04* (2009.01)
(Continued)

(52) U.S. Cl.
CPC .......... *H04W 76/046* (2013.01); *H04W 8/08* (2013.01); *H04W 36/0022* (2013.01); *H04W 8/082* (2013.01)

(58) Field of Classification Search
CPC . H04W 76/046; H04W 8/08; H04W 36/0022; H04W 8/082
See application file for complete search history.

(56) References Cited

U.S. PATENT DOCUMENTS 8,989,142 B2 * 3/2015 Chin ................ H04W 36/0022
370/310
2009/0238143 A1 9/2009 Mukherjee et al.
(Continued)

FOREIGN PATENT DOCUMENTS

CN 201499311 U 6/2010
CN 103314617 A 9/2013
(Continued)

OTHER PUBLICATIONS

Research in Motion UK, Limited, Correction to CSFB Procedure for UEs with LIPA PDN Connections Only, 3GPP TSG SA WG2 Meeting #83, Salt Lake City, US, Feb. 21-26, 2011, S2-110278, 3rd Generation Partnership Project (3GPP), Sophia-Antipolis, France.
(Continued)

*Primary Examiner* — Phuc Tran
(74) *Attorney, Agent, or Firm* — Jefferson IP Law, LLP

(57) ABSTRACT

A method for supporting local access and voice communication by a User Equipment (UE) in a wireless network, the method comprises transmitting a message for requesting a Circuit Switch (CS)-based voice service to a eNode B, the UE having a local Internet Protocol (IP)-based Packet Data Network (PDN) connection, and receiving, from the eNode B, a message including information indicating that the local IP-based PDN connection is suspended, if a server manag-
(Continued)

ing mobility of the UE determines that suspending the local IP-based PDN connection is supported in a local gateway.

26 Claims, 7 Drawing Sheets

(51) Int. Cl.
*H04W 36/00* (2009.01)
*H04W 8/08* (2009.01)

(56) References Cited

U.S. PATENT DOCUMENTS

| | | | |
|---|---|---|---|
| 2010/0135206 A1* | 6/2010 | Cherian | H04W 36/0066 370/328 |
| 2010/0278108 A1* | 11/2010 | Cho | H04W 76/022 370/328 |
| 2011/0092198 A1 | 4/2011 | Miyata | |
| 2011/0149908 A1* | 6/2011 | Olsson | H04W 60/005 370/331 |
| 2011/0207481 A1* | 8/2011 | Yin | H04W 68/005 455/458 |
| 2012/0069817 A1* | 3/2012 | Ling | H04W 36/14 370/331 |
| 2012/0182912 A1* | 7/2012 | Watfa | H04W 36/0022 370/311 |
| 2013/0188605 A1* | 7/2013 | Godin | H04W 76/06 370/331 |
| 2013/0294413 A1 | 11/2013 | Kim et al. | |
| 2014/0177590 A1* | 6/2014 | Sirotkin | H04W 52/0225 370/331 |

FOREIGN PATENT DOCUMENTS

| | | |
|---|---|---|
| JP | 2010-098612 A | 4/2010 |
| JP | 2011-091587 A | 5/2011 |
| KR | 10-2010-0060353 A | 6/2010 |
| KR | 10-2010-0126818 A | 12/2010 |
| KR | 10-2010-0130043 A | 12/2010 |
| KR | 10-2011-0020166 A | 3/2011 |
| WO | 2010-062137 A3 | 6/2010 |
| WO | 2012/097115 A1 | 7/2012 |

OTHER PUBLICATIONS

3rd Generation Partnership Project; Technical Specification Group TSG SA; Study on Continuity of Data Sessions to Local Networks (Release 11), 3GPP TR 22.896, Sep. 2011, pp. 1-13, V1.0.1, 3GPP, Sophia-Antipolis, France.

* cited by examiner

METHOD AND APPARATUS FOR SUPPORTING LOCAL ACCESS AND VOICE COMMUNICATION IN A LOCAL NETWORK

CROSS-REFERENCE TO RELATED APPLICATION(S)

This application is a U.S. National Stage application under 35 U.S.C. §371 of an International application filed on Sep. 28, 2012 and assigned application number PCT/KR2012/007970, which claimed the benefit of a Korean patent application filed on Sep. 29, 2011 in the Korean Intellectual Property Office and assigned Serial number 10-2011-0099421, the entire disclosure of which is hereby incorporated by reference.

TECHNICAL FIELD

The present disclosure relates to a technology which enables Local Internet Protocol Access (LIPA). More particularly, a LIPA connection may be suspended and may be continuously used even when a User Equipment (UE) which is using LIPA performs voice communication in a local network system.

BACKGROUND

Local IP Access (LIPA) is a technology which allows traffic exchanged in a local network not to go through a mobile carrier network.

FIG. 1 is a view illustrating a configuration of a typical local network according to the related art.

Referring to FIG. 1, a structure of a local network which supports LIPA includes a Home Node or Home eNode B (H(e)NB) and a Local Gateway (L-GW) connected to the H(e)NB. A User Equipment (UE) generates a LIPA Packet Data Network (PDN) connection through the L-GW, and may communicate with another Internet Protocol (IP) device within the local network.

Long Term Evolution (LTE) does not support communication of a Circuit Switch (CS) scheme, and supports only communication of a Packet Switch (PS) scheme for transmitting an IP packet. Accordingly, when a UE of an LTE system desires voice communication, a scheme may be used in which the UE of the LTE system is handed over to an existing system. The existing system may be a legacy system such as a Universal Terrestrial Radio Access Network (UTRAN), a GSM EDGE Radio Access Network (GERAN), or the like, which supports the CS scheme, where a voice service is provided to the UE of the LTE system in the CS scheme. This scheme is referred to as "CS Fallback (CSFB)."

When the UE of the LTE system using a LIPA PDN connection uses CSFB in order to transmit and/or receive a voice, the UE of the LTE system cannot use the LTE system any longer, and thus the use of the LIPA PDN connection needs to be stopped. Currently, in a 3rd Generation Partnership Project (3GPP) LTE standard, when the H(e)NB which is a base station of the LTE system is switched to another base station due to the movement of the UE using the LIPA PDN connection or due to a function of using another Radio Access Network (RAN), such as CSFB, the LIPA PDN connection is unconditionally deactivated.

When the UE having the LIPA PDN connection deactivates the LIPA PDN connection due to the CSFB, a session of traffic transmitted and/or received through the LIPA PDN connection does not exist any longer. Specifically, due to the CSFB, the UE cannot communicate with a target IP device by using an identical IP address any longer. When the LIPA PDN connection is deactivated once, after voice communication using the CSFB is terminated, the UE must generate a LIPA PDN connection before receiving a LIPA service again. A new IP address is assigned to the UE. If the LIPA PDN connection is deactivated during the generation of the CSFB as described above, deactivation becomes a main cause of degrading IP-based service quality of the UE simultaneously using the CSFB and a LIPA function.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus which efficiently provide a service of a Circuit Switch (CS) scheme to a User Equipment (UE) connected to an Internet Protocol (IP)-based network while suspending a Packet Data Network (PDN) connection to the UE.

In accordance with an aspect of the present disclosure, a method for supporting local access and voice communication in a wireless network is provided. The method comprises transmitting a message for requesting a Circuit Switch (CS)-based voice service to a eNode B, the UE having a local Internet Protocol (IP)-based Packet Data Network (PDN) connection, and receiving, from the eNode B, a message including information indicating that the local IP-based PDN connection is suspended, if a server managing mobility of the UE determines that suspending the local IP-based PDN connection is supported in a local gateway.

In accordance with an aspect of the present disclosure, a User Equipment (UE) for supporting local access and voice communication in a wireless network is provided, the UE comprises a transceiver for transmitting and receiving messages over the wireless network, and a controller for controlling operations of transmitting a message for requesting a Circuit Switch (CS)-based voice service to a eNode B, the UE having a local Internet Protocol (IP)-based Packet Data Network (PDN) connection, and receiving, from the eNode B, a message including information indicating that the local IP-based PDN connection is suspended, if a server managing mobility of the UE determines that suspending the local IP-based PDN connection is supported in a local gateway.

In accordance with another aspect of the present disclosure, a method for supporting local access and voice communication by an eNode B in a wireless network is provided, the method comprises receiving a message for requesting a Circuit Switch (CS)-based voice service from a User Equipment (UE), the UE having a local Internet Protocol (IP)-based Packet Data Network (PDN) connection, and transmitting, to the UE, a message including information indicating that the local IP-based PDN connection is suspended, if a server managing mobility of the UE determines that suspending the local IP-based PDN connection is supported in a local gateway.

In accordance with another aspect of the present disclosure, an eNode for supporting local access and voice communication in a wireless network is provided, the eNode comprises a transceiver for transmitting and receiving messages over the wireless network, and a controller for controlling operations of receiving a message for requesting a Circuit Switch (CS)-based voice service from a User Equipment (UE), the UE having a local Internet Protocol (IP)-based Packet Data Network (PDN) connection, and transmitting, to the UE, a message including information indicating that the local IP-based PDN connection is suspended, if a server managing mobility of the UE determines that suspending the local IP-based PDN connection is supported in a local gateway.

In accordance with further aspect of the present disclosure, a method for supporting local access and voice communication by a server managing mobility in a wireless network is provided, the method comprises receiving a message for requesting a Circuit Switch (CS)-based voice service from a User Equipment (UE) via an eNode B, the UE having a local Internet Protocol (IP)-based Packet Data Network (PDN) connection, and transmitting, to the UE via the eNode B, information indicating that the local IP-based PDN connection is suspended, if the server managing mobility of the UE determines that suspending the local IP-based PDN connection is supported in a local gateway.

In accordance with further aspect of the present disclosure, a server for supporting local access and voice communication in a wireless network, the server comprises a communication interface for communicating with network entities, and a controller for controlling operations of receiving a message for requesting a Circuit Switch (CS)-based voice service from a User Equipment (UE) via an eNode B, the UE having a local Internet Protocol (IP)-based Packet Data Network (PDN) connection, and transmitting, to the UE via the eNode B, information indicating that the local IP-based PDN connection is suspended, if the server managing mobility of the UE determines that suspending the local IP-based PDN connection is supported in a local gateway.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
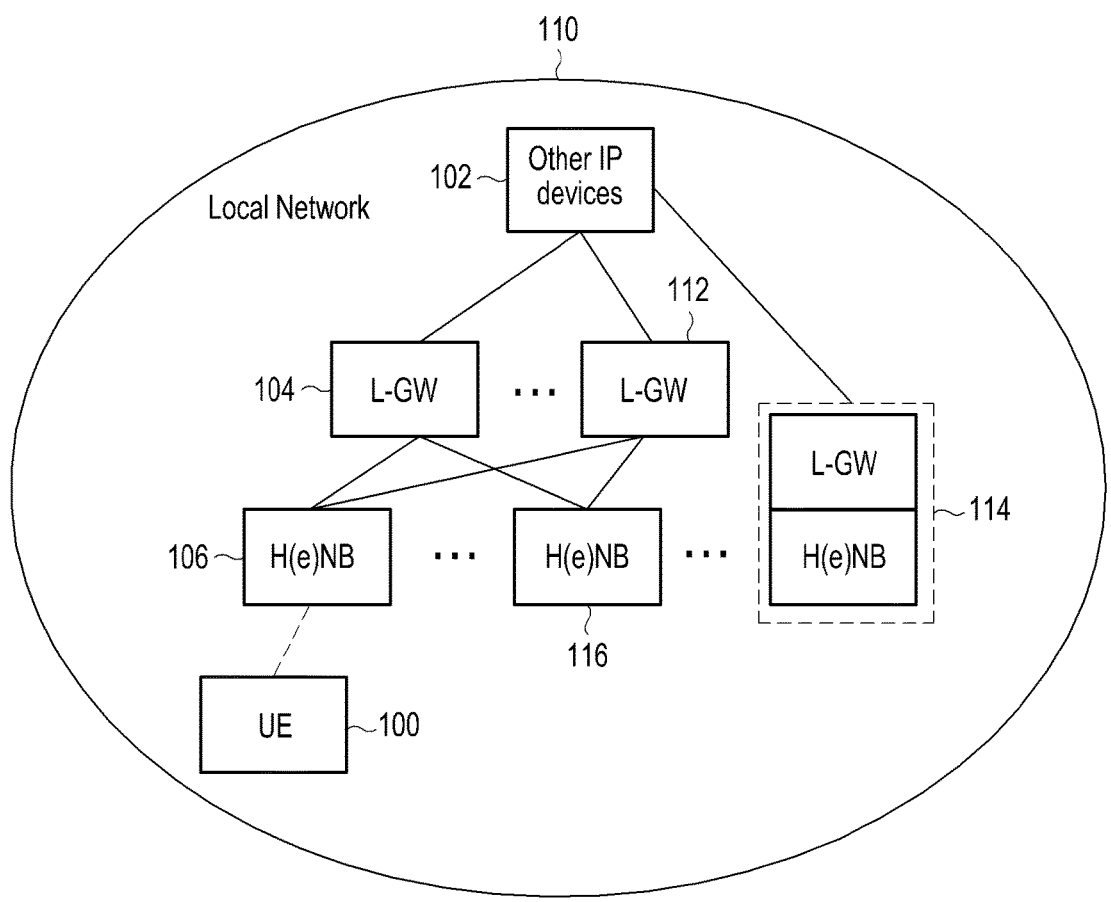
FIG. 1 is a view illustrating a configuration of a local network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a detailed description of various embodiments of the present disclosure, a basic 3rd Generation Partnership Project (3GPP) Long Term Evolution (LTE) system will be considered as the main subject. However, various embodiments of the present disclosure may be applied even to other communication and/or computer systems having a similar technical background and a similar system form without significantly departing from the scope of the present disclosure. This applicability may be determined by those skilled in the art in the technical field of the present disclosure.

In the detailed description of various embodiments of the present disclosure, for convenience of understanding, a case in which a User Equipment (UE) attempts voice communication, particularly, a process for a mobile oriented call is described. After a network transmits paging to the UE, a process for an actual mobile terminated call is performed identically to a process for a mobile originated call. Accordingly, various embodiments of the present disclosure may be applied even to a case of the occurrence of CS Fallback (CSFB) for a mobile terminated call.

The various embodiments of the present disclosure described below propose a method which, when a UE having a Local IP Access (LIPA) Packet Data Network (PDN) uses CSFB, enables an Internet Protocol (IP) session of a relevant LIPA PDN connection to be suspended despite the use of the CSFB in such a manner that the relevant LIPA PDN connection is not deactivated, but instead is suspended, and which continuously provides a LIPA service to the UE by using an identical IP address after a CSFB voice call is terminated.

In various embodiments of the present disclosure, when CSFB occurs in the case of the UE having the LIPA PDN connection, whether the LIPA PDN connection of the relevant UE is capable of being suspended is determined by a Mobility Management Entity (MME), which is a server managing the mobility of the UE, and has received an extended service request for the CSFB from the UE having the LIPA PDN connection. When the LIPA PDN connection of the relevant UE is capable of being suspended, the MME delivers, to an H(e)NB, a CSFB indicator indicating the CSFB together with a suspend indicator indicating suspending of the LIPA PDN connection, in a response message. When receiving the suspend indicator from the MME, the H(e)NB notifies the relevant UE that the LIPA PDN connection of the relevant UE is not deactivated but is suspended.

Alternatively, other various embodiments of the present disclosure propose a procedure in which, when an Local Gateway (L-GW) supporting a LIPA PDN service supports a function of suspending a LIPA PDN connection, in order to recognize that the L-GW, for example, is prescribed in an LTE Release 11 standard, the MME receives the suspend indicator directly from the L-GW, receives the suspend indicator through the H(e)NB, or receives the suspend indicator from a Domain Name Server (DNS).

Hereinafter, the various embodiments of the present disclosure will be described with reference to the accompanying drawings.

FIG. 1 is a view illustrating a local network 110 according to the related art.

Referring to FIG. 1, the local network 110 may use stand-alone L-GWs 104 and 112. The one local network 110 includes a UE 100, multiple H(e)NBs, L-GWs, and other IP devices 102. A basic operation of the H(e)NB and that of the L-GW may refer to the LTE standard. As an example illustrated in FIG. 1, in the local network, H(e)NBs 106, ..., 116 and L-GWs 104, ..., 112 may be separated or may be located together as indicated by reference numeral 114.

Figure 2:
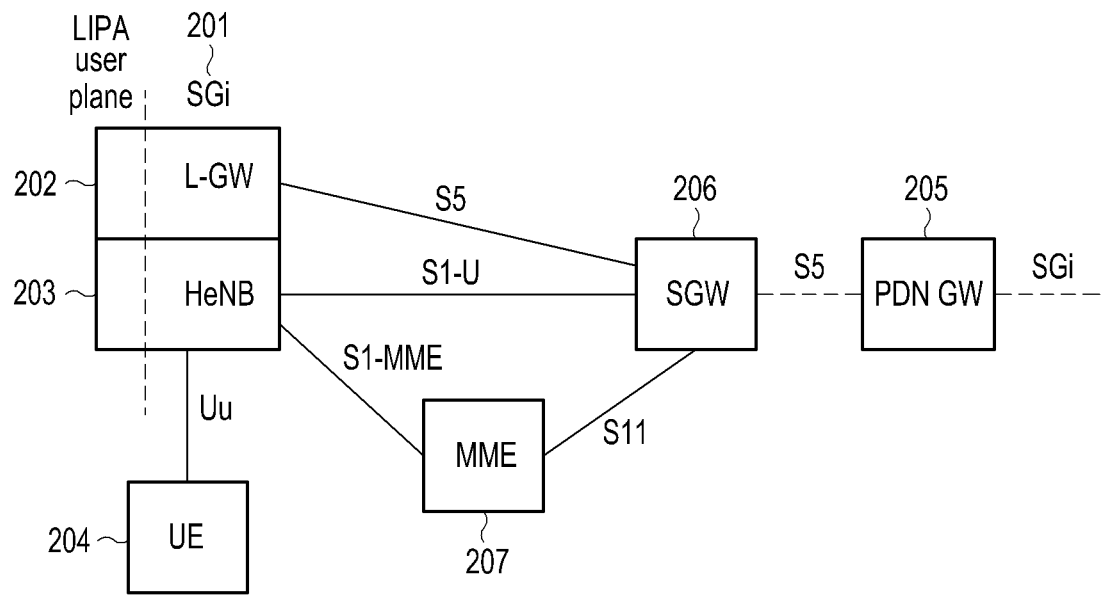
FIG. 2 is a view illustrating a configuration of a network for providing a Local IP Access (LIPA) service according to an embodiment of the present disclosure.

FIG. 2 is a view illustrating a configuration of a network for providing a LIPA service according to an embodiment of the present disclosure.

FIG. 2 illustrates in more detail a network structure for supporting LIPA which enables user local traffic to be transmitted without going through a core network in the local network.

Referring to FIG. 2, interfaces such as SGi, Uu, S5, S1-U, S1-MME, S11, S5 and the like may refer to the LTE standard document, and thus a detailed description thereof is omitted. FIG. 2 illustrates, for example, a case in which an H(e)NB and an L-GW are co-located, but the identical structure may be applied even to a case in which the H(e)NB 203 and the L-GW 202 are separated. When the H(e)NB 203 and the L-GW 202 are separated, although not illustrated in FIG. 2, the H(e)NB 203 and the L-GW 203 may be connected to each other through a separate interface, for example, an Sx Interface (here, x represents an interface number). When the H(e)NB 203 and the L-GW 202 are implemented as described above, if the UE 204 receives a LIPA service, a LIPA PDN connection may be connected to an external network through the H(e)NB 203 and the L-GW 202 differently from an existing PDN connection, namely, a path connected to the external network through a PDN Gateway (P-GW) 205 via a Serving Gateway (S-GW) 206 from the HeNB 203. Accordingly, when the H(e)NB 203 and the L-GW 202 are used, local traffic may be delivered to the external network even without going through a carrier network. The interface S1-MME connects the HeNB 203 and the MME 207. Likewise, interface S11 connects the MME 207 and the S-GW 206.

Figure 3:
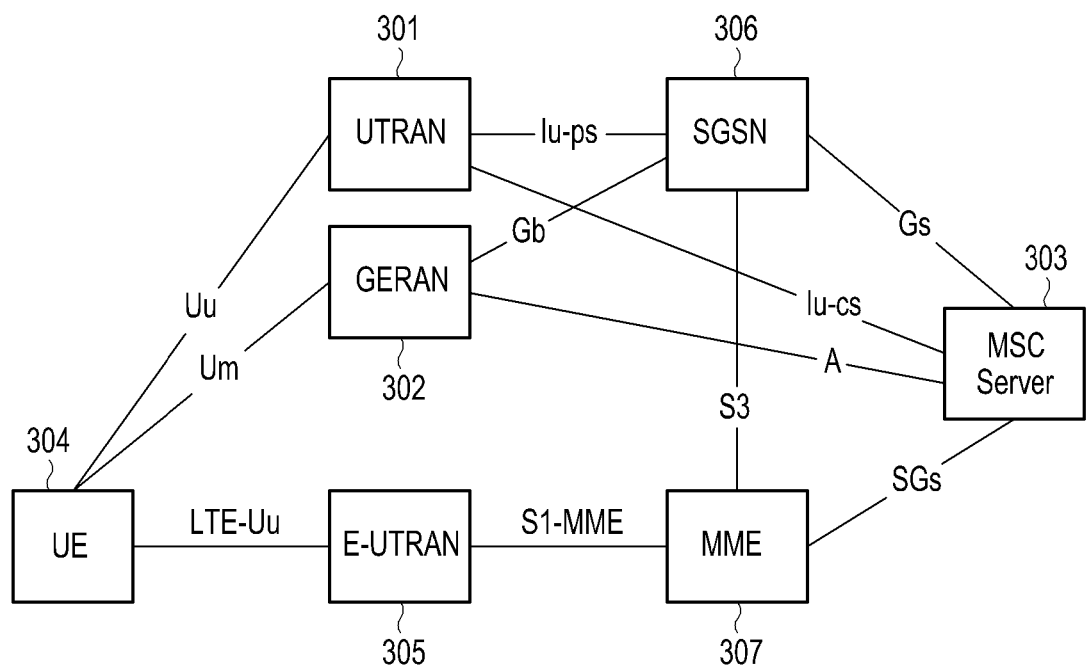
FIG. 3 is a view illustrating an example of a configuration of a network for providing CS Fallback (CSFB), according to an embodiment of the present disclosure.

FIG. 3 is a view illustrating an example of a configuration of a network for providing CSFB according to an embodiment of the present disclosure.

Typically, as the LTE system supports only a PS mode, in order to use a Circuit Switch (CS) mode for voice communication, the UE 304 should be handed over to an existing system, such as a Universal Terrestrial Radio Access Network (UTRAN) 301 or a GSM EDGE Radio Access Network (GERAN) 302. When a user uses CSFB, the UE 304 is handed over to the UTRAN 301 or the GERAN 302, and may receive a voice communication service connected to a Mobile Switching Center (MSC) 303. Communication interfaces used on respective paths, which go through the UTRAN 301, the GERAN 302, and/or an E-UTRAN 305 from the UE 304, are described in detail in the standard. Accordingly, in this specification, a detailed description of the communication interfaces will be omitted.

As described above, according to the current LTE technology, when the UE 303 having the LIPA PDN connection uses CSFB, before the H(e)NB 203 hands over the UE 304 to the UTRAN 301 or the GERAN 302, the H(e)NB 203 necessarily deactivates the LIPA PDN connection, and the deactivation thereof leads to the degradation of quality of an IP service provided to the user.

To this end, various embodiments of the present disclosure propose the following procedures illustrated in FIG. 4 to FIG. 8, which, when CSFB occurs to the UE 304 having the LIPA PDN connection, suspend the LIPA PDN connection and thereby enable the UE 304 to receive a continuous LIPA service even after CSFB voice communication is terminated. The Serving GPRS Support Node (SGSN) 306 handles packet switched data within the network. A Mobility Management Entity (MME) 307, is a server managing the mobility of the UE 304.

Figure 4:
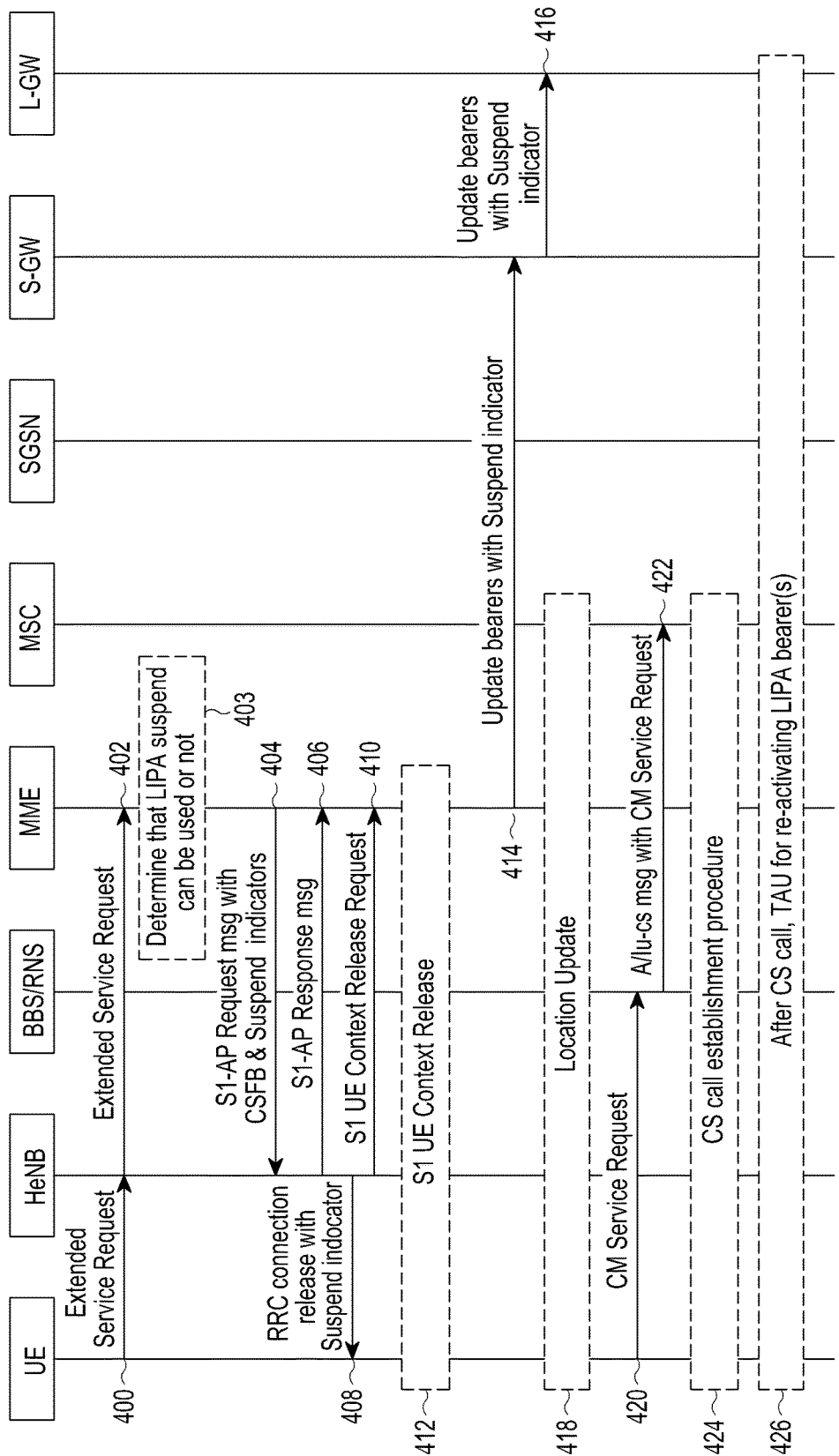
FIG. 4 is a signal flow diagram illustrating a process for suspending a LIPA Packet Data Network (PDN) connection in a CSFB process of a User Equipment (UE) having the LIPA PDN connection according to an embodiment of the present disclosure.

FIG. 4 is a signal flow diagram illustrating a process for suspending a LIPA PDN connection in a CSFB process of a UE having the LIPA PDN connection according to an embodiment of the present disclosure.

Referring to FIG. 4, when, in operation 400, the UE transmits an extended service request message to the H(e)NB in order to perform CSFB communication which is a CS-based voice service, the H(e)NB delivers the extended service request message to the MME in operation 402. In operation 403, when the UE is capable of using CSFB, the MME determines whether a LIPA PDN connection is capable of being suspended. When the UE is capable of using the CSFB, the MME transmits a message allowing CSFB to the H(e)NB, in operation 404. When the LIPA PDN connection is capable of being suspended, the MME transmits the message, which is transmitted to the H(e)NB, including a suspend indicator so as not to deactivate the LIPA PDN connection, in operation 404. According to the related art, after the H(e)NB receives a CSFB command from the MME, the H(e)NB necessarily deactivates the LIPA PDN connection. However, according to an embodiment of the present disclosure, the H(e)NB which has received the suspend indicator from the message in operation 404 transmits a response message to the MME in operation 406. In operation 408, the H(e)NB releases a Radio Resource Control (RRC) connection of the UE without deactivating the LIPA PDN connection. In this process, the H(e)NB delivers, to the UE, information on a cell of a Radio Access Network (RAN), namely, a UTRAN or a GERAN, which is to provide CS voice communication, and enables a rapid handover to proceed.

In operation 408, the H(e)NB delivers, to the UE, an RRC connection release message including a suspend indicator for notifying that the LIPA PDN connection is not deactivated but is suspended. When the LIPA PDN connection is not capable of being suspended in operation 408 is not related to the subject matter of the present disclosure and therefore a detailed description thereof will be omitted.

In operations 410 and 412, the MME releases S1 UE context, and causes the UE to enter an idle state in the LTE system. In operation 414, in order to cause the LIPA PDN connection to enter a suspend state, the MME delivers an update bearer request message together with a suspend indicator to an S-GW.

In operation 416, after updating a LIPA bearer of the UE to a suspend state, the S-GW delivers the update bearer request message together with the suspend indicator to the L-GW. Here, the L-GW is a kind of P-GW. Then, the L-GW updates the LIPA PDN connection of the UE to a suspend state.

In operations 418, 420, 422 and operation 424, when the UE which has terminated the CSFB voice communication again receives a LIPA service in the LTE system, the UE performs Tracking Area Update (TAU) for re-activating the LIPA bearer thereof, in operation 426. The existing LIPA PDN connection that the UE has used is again re-activated. Accordingly, the UE continuously receives the LIPA service by using an identical IP address used in the LIPA service before the CSFB voice communication.

Another embodiment of the present disclosure proposes a method which enables the MME to indicate that at least one of whether an L-GW generating a LIPA PDN connection supports suspending of the LIPA PDN connection, and Release information (i.e., Rel-11 or Pre Rel-11) of the L-GW, in view of a case in which there coexists an L-GW that supports a function of suspending the LIPA PDN connection (i.e., an L-GW prescribed in an LTE Rel-11 standard) and an L-GW which does not support the function of suspending the LIPA PDN connection (i.e., an L-GW prescribed in a Release standard before the LTE Rel-11 standard).

Figure 5:
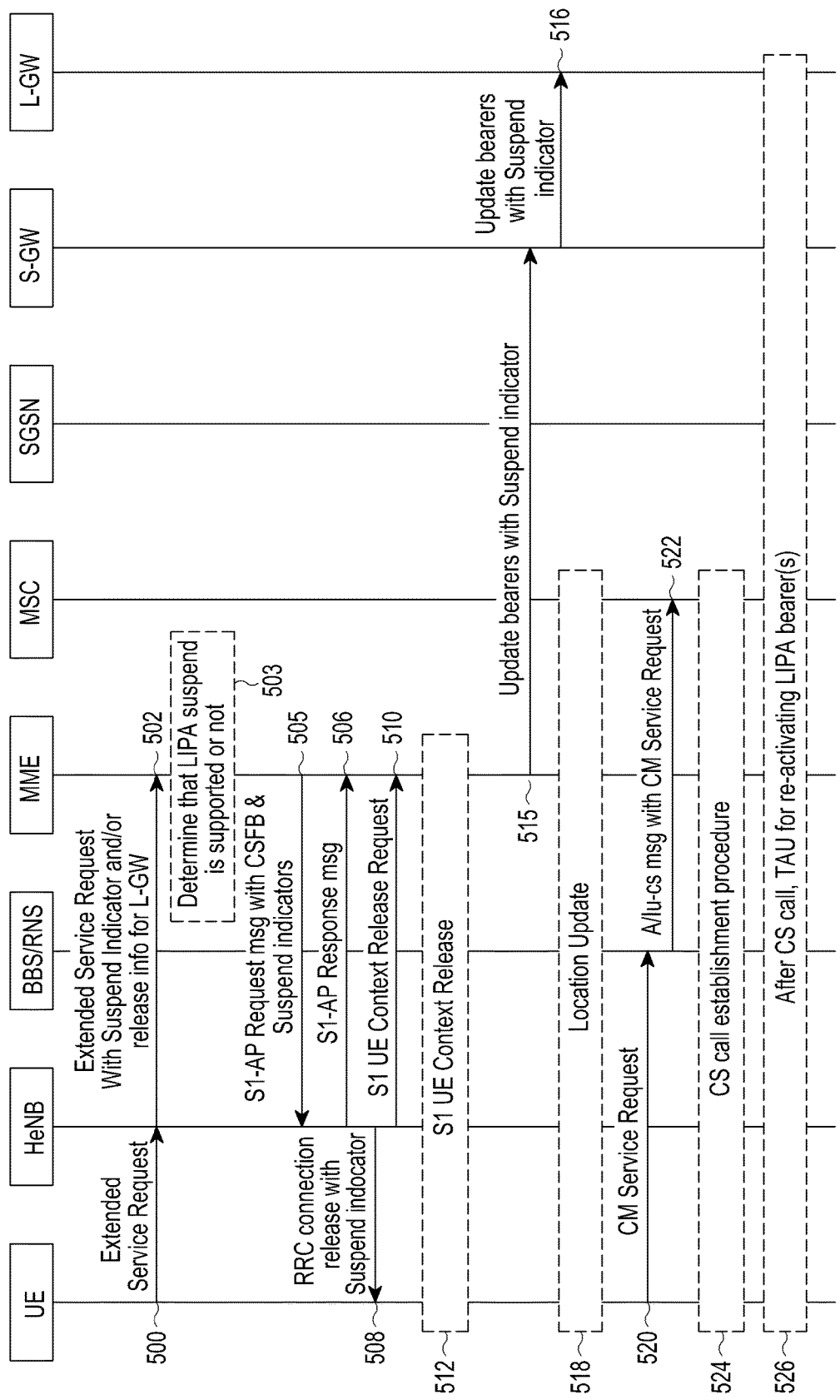
FIG. 5 is a signal flow diagram illustrating a process in which an HeNB provides information on an Local Gateway (L-GW) together with a message for CSFB to an Mobility Management Entity (MME) according to an embodiment of the present disclosure.

FIG. 5 is a signal flow diagram illustrating a process in which an HeNB provides information on an L-GW together with a message for CSFB to an MME according to an embodiment of the present disclosure.

The information on the L-GW includes at least one of information on whether the relevant L-GW supports the function of suspending the LIPA PDN connection and Release information of the relevant L-GW.

Referring to FIG. 5, in operation 500, the UE having a LIPA PDN connection transmits an extended service request to the H(e)NB in order to use CSFB. In operation 502, when delivering the extended service request to the MME, the HeNB delivers the extended service request together with at least one of whether suspending of the LIPA PDN connection is supported by the L-GW connected to the H(e)NB and Release information of the L-GW. The H(e)NB may determine the information on the L-GW, from a pre-configuration, from an interface directly connected to the relevant L-GW, or from an HeNB Management System (HMS), etc. which is prescribed in the LTE standard.

In operation 503, the MME determines whether the LIPA PDN connection is suspended, based on the information on the L-GW which has been delivered by the H(e)NB, transmits a message allowing CSFB to the H(e)NB, and performs a series of processes for suspending the LIPA PDN connection. In FIG. 5, operations 505, 506, 508, 510, 512, 515, 516, 518, 520, 522, 524 and 526 are identical to operations 404, 406, 408, 410, 412, 414, 416, 418, 420, 422, 424 and operation 426 respectively, as illustrated in FIG. 4. Accordingly, a detailed description thereof will be omitted.

Figure 6:
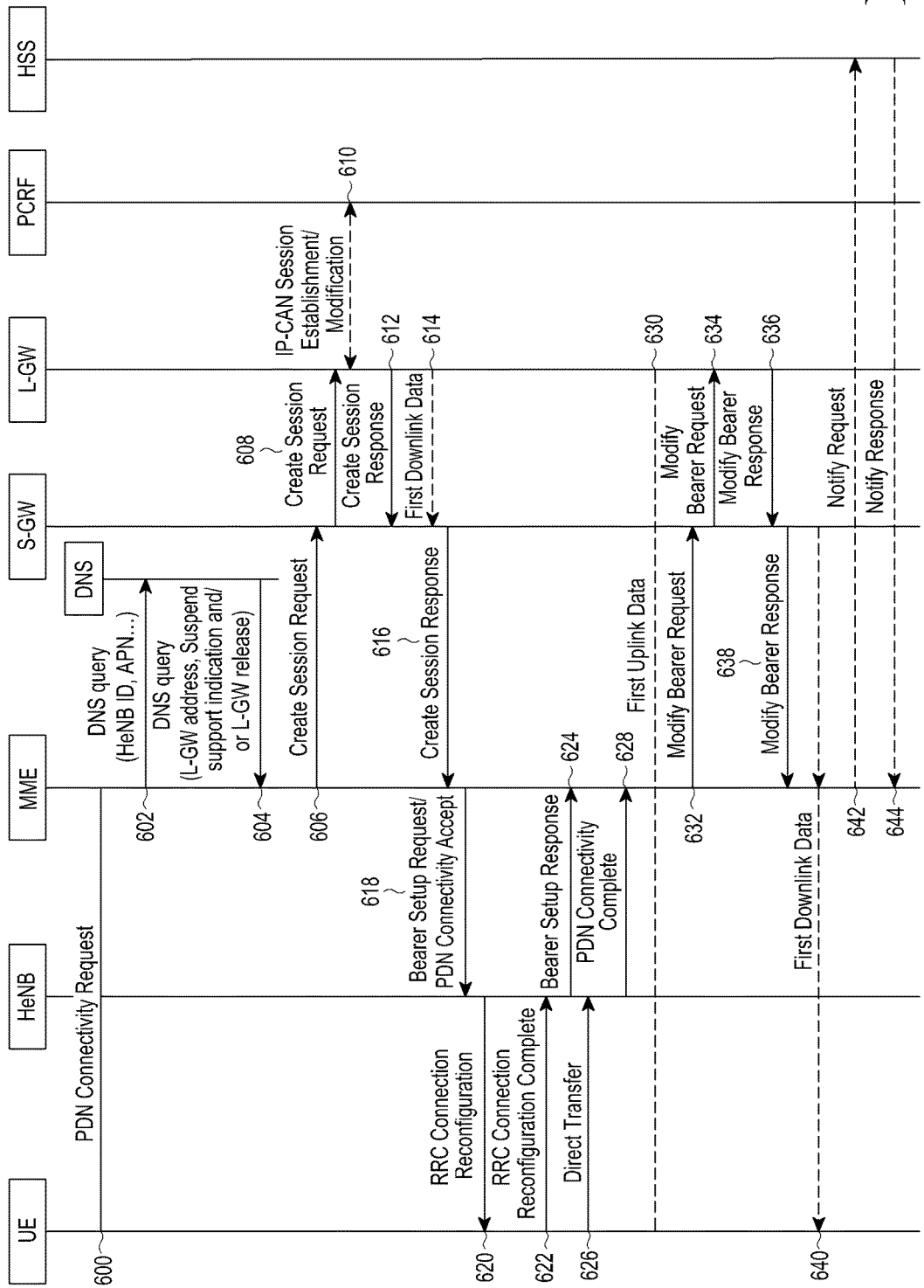
FIG. 6 is a signal flow diagram illustrating a process in which an MME acquires information on an L-GW through a Domain Name Server (DNS) according to an embodiment of the present disclosure.

FIG. 6 is a signal flow diagram illustrating a process in which an MME acquires information on an L-GW from a DNS according to an embodiment of the present disclosure.

Referring to FIG. 6, in operation 600, when the UE transmits a PDN connectivity request to the H(e)NB in order to receive a LIPA service, the H(e)NB delivers the PDN connectivity request to the MME. In operation 602, the MME may transmit a query of the information on the L-GW to a DNS by using at least one of an Access Point Name (APN) included in the PDN connectivity request, an Identifier (ID) of the H(e)NB to which the UE is connected, and an ID of the L-GW. In embodiments of the present disclosure, the DNS has the information on the L-GW, such as an address of the L-GW, whether the L-GW supports suspending of LIPA, the Release information of the L-GW, etc., and may provide the MME with the relevant information on the L-GW at a request from the MME.

Operations 606, 608, 610, 612, 614, 616, 618, 620, 622, 624, 626, 628, 630, 632, 634, 636, 638, 640, 642 and 644 illustrated in FIG. 6, are identical to a typical process for generating a PDN connection. Accordingly, in this specification, a description thereof is omitted. Thereafter, when CSFB occurs, according to the above-described embodiment of the present disclosure, the MME may determine whether the LIPA PDN connection is being suspended, by using the information on the L-GW acquired from the DNS.

Figure 7:
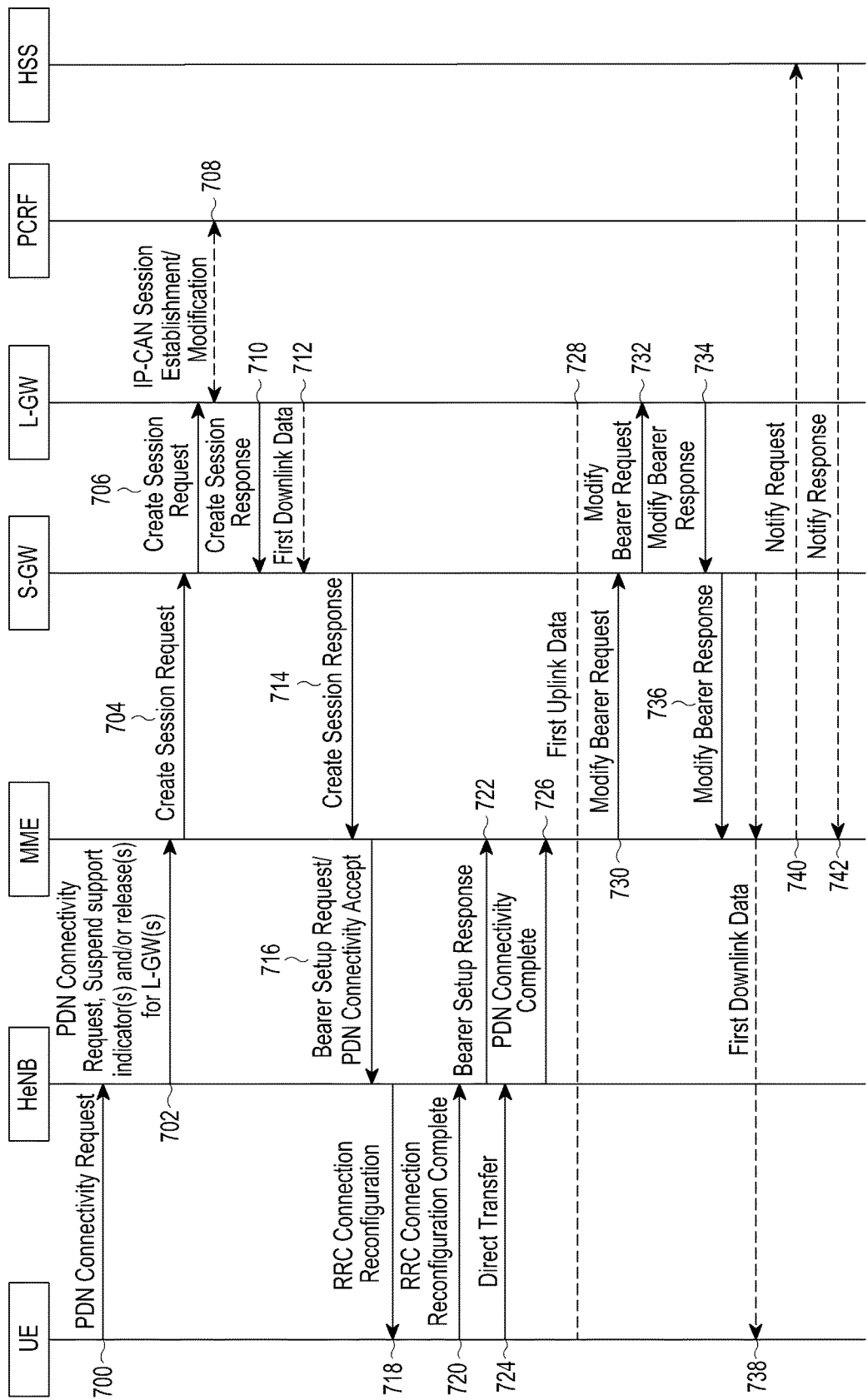
FIG. 7 is a signal flow diagram illustrating a process in which an H(e)NB provides information on an L-GW to an MME in a process for generating (setting up) a LIPA PDN connection according to an embodiment of the present disclosure.

FIG. 7 is a signal flow diagram illustrating a process in which an H(e)NB provides information on the L-GW to an MME in a process for generating (setting up) a LIPA PDN connection according to an embodiment of the present disclosure.

Referring to FIG. 7, in operation 700, the UE transmits a PDN connectivity request to an H(e)NB in order to receive a LIPA service. In operation 702, the H(e)NB delivers the PDN connectivity request to the MME. At this time, the H(e)NB may deliver, to the MME, information on the L-GW including at least one of whether the L-GW supports suspending of LIPA and Release information of the L-GW together with the PDN connectivity request delivered to the MME in operation 702. The H(e)NB may determine the information on the L-GW from a pre-configuration, from an interface directly connected to the L-GW, or from the above-described HMS and the like. In FIG. 7, operations 704, 706, 708, 710, 712, 714, 716, 718, 720, 722, 724, 726, 728, 730, 732, 734, 736, 738, 740 and 742 are identical to a typical process for generating (setting up) a PDN connection. Accordingly, a detailed description thereof is omitted. Thereafter, when CSFB occurs, according to the above-described embodiment of the present disclosure, the MME may determine whether the LIPA PDN connection is being suspended, by using the information on the L-GW.

Figure 8:
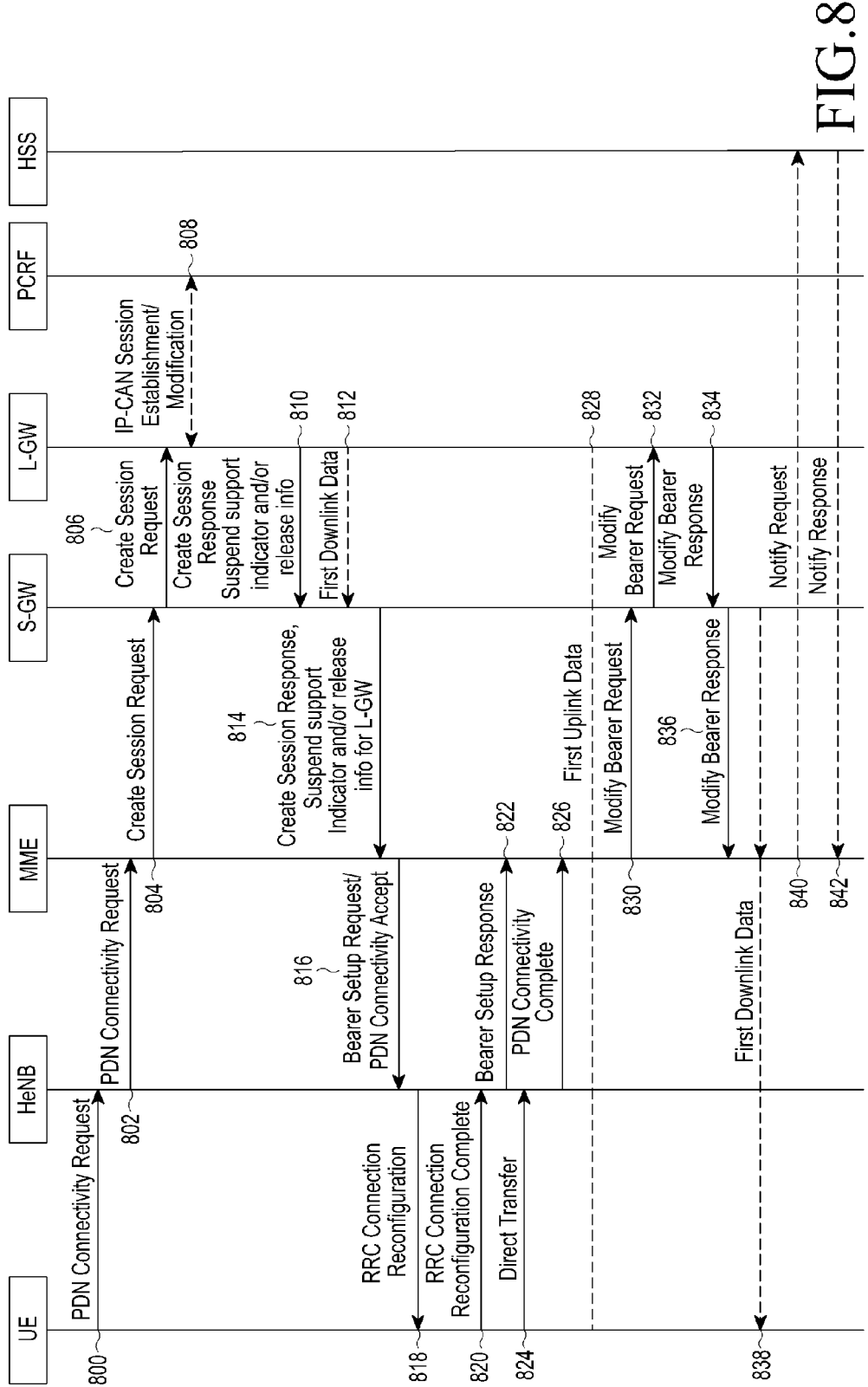
FIG. 8 is a signal flow diagram illustrating a process in which an L-GW provides information on an L-GW to an MME through an Serving Gateway (S-GW) in a process for generating (setting up) a LIPA PDN connection according to an embodiment of the present disclosure.

FIG. 8 is a signal flow diagram illustrating a process in which an L-GW provides information on a L-GW to an MME from an S-GW in a process for generating (setting up) a LIPA PDN connection according to an embodiment of the present disclosure.

Referring to FIG. 8, the UE transmits a PDN connectivity request to the H(e)NB in order to receive a LIPA service. In operation 802, the H(e)NB delivers the PDN connectivity request to the MME. In FIG. 8, operations 804, 806 and 808 are a typical process for generating a LIPA PDN connection. In operation 810, when the L-GW transmits, to the S-GW, a response to a create session request of a session related to a LIPA PDN connection, the L-GW transmits, to the S-GW, the response together with information on the L-GW which includes at least one of whether the L-GW supports suspending of LIPA and Release information of the L-GW. In operation 814, the S-GW again delivers, to the MME, the information on the L-GW received from the L-GW.

Operations 816, 818, 820, 822, 824, 826, 828, 830, 832, 834, 836, 838, 840 and 842 illustrated in FIG. 8 are identical to a typical process for generating a PDN connection. Accordingly, a detailed description thereof is omitted. Thereafter, when CSFB occurs, according to the above-described embodiment of the present disclosure, the MME may determine whether the LIPA PDN connection is being suspended, by using information on the L-GW acquired from the L-GW via the S-GW.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for supporting local access and voice communication by a User Equipment (UE) in a wireless network, the method comprising:
transmitting, by the UE, a message for requesting a Circuit Switch (CS)-based voice service to a eNode B, the UE having a local Internet Protocol (IP)-based Packet Data Network (PDN) connection; and
receiving, from the eNode B, a message including information indicating that the local IP-based PDN connection is suspended and is not deactivated, if it is determined by a server managing mobility of the UE that suspending the local IP-based PDN connection is supported in a local gateway.

2. The method as claimed in claim 1, wherein the message including the information uses a Radio Resource Control (RRC) connection release message.

3. The method as claimed in claim 1, wherein the indication information indicating is provided via the eNode B from the server.

4. The method as claimed in claim 1, wherein the server acquires the indication information from a Domain Name Server (DNS), the local gateway via a serving gateway, or the eNode B, if the server receives a PDN connectivity request from the UE.

5. A User Equipment (UE) for supporting local access and voice communication in a wireless network, the UE comprising:
a transceiver configured to transmit and receive messages over the wireless network; and
a controller configured to:
transmit a message for requesting a Circuit Switch (CS)-based voice service to a eNode B, the UE having a local Internet Protocol (IP)-based Packet Data Network (PDN) connection, and
receive, from the eNode B, a message including information indicating that the local IP-based PDN connection is suspended and is not deactivated, if it is determined by a server managing mobility of the UE that suspending the local IP-based PDN connection is supported in a local gateway.

6. The UE as claimed in claim 5, wherein the message including the information uses a Radio Resource Control (RRC) connection release message.

7. The UE as claimed in claim 5, wherein the indication information is provided via the eNode B from the server.

8. The UE as claimed in claim 5, wherein the server acquires the indication information from a Domain Name Server (DNS), the local gateway via a serving gateway, or the eNode B, if the server receives a PDN connectivity request from the UE.

9. A method for supporting local access and voice communication by an eNode B in a wireless network, the method comprising:
receiving a message for requesting a Circuit Switch (CS)-based voice service from a User Equipment (UE), the UE having a local Internet Protocol (IP)-based Packet Data Network (PDN) connection; and
transmitting, to the UE, a message including information indicating that the local IP-based PDN connection is suspended and is not deactivated, if it is determined by a server managing mobility of the UE that suspending the local IP-based PDN connection is supported in a local gateway.

10. The method as claimed in claim 9, wherein the message including the information uses a Radio Resource Control (RRC) connection release message.

11. The method as claimed in claim 9, wherein the indication information is provided from the server.

12. The method as claimed in claim 9, wherein the server acquires the indication information from a Domain Name Server (DNS), the local gateway via a serving gateway, or the eNode B, if the server receives a PDN connectivity request from the UE.

13. The method as claimed in claim 9, further comprising not releasing a bearer for the local IP-based PDN connection, if suspending the local IP-based PDN connection is supported in the local gateway.

14. An eNode for supporting local access and voice communication in a wireless network, the eNode comprising:
a transceiver configured to transmit and receive messages over the wireless network;
a controller configured to:
receive a message for requesting a Circuit Switch (CS)-based voice service from a User Equipment (UE), the UE having a local Internet Protocol (IP)-based Packet Data Network (PDN) connection, and
transmit, to the UE, a message including information indicating that the local IP-based PDN connection is suspended and is not deactivated, if it is determined by a server managing mobility of the UE determines that suspending the local IP-based PDN connection is supported in a local gateway.

15. The eNode as claimed in claim 14, wherein the message including the information uses a Radio Resource Control (RRC) connection release message.

16. The eNode as claimed in claim 14, wherein the indication information is provided from the server.

17. The eNode as claimed in claim 14, wherein the server is configured to acquire the indication information from a Domain Name Server (DNS), the local gateway via a serving gateway, or the eNode B, if the server receives a PDN connectivity request from the UE.

18. The eNode as claimed in claim 14, wherein the controller is further configured not to release a bearer for the local IP-based PDN connection, if suspending the local IP-based PDN connection is supported in the local gateway.

19. A method for supporting local access and voice communication by a server managing mobility in a wireless network, the method comprising:
receiving a message for requesting a Circuit Switch (CS)-based voice service from a User Equipment (UE) via an eNode B, the UE having a local Internet Protocol (IP)-based Packet Data Network (PDN) connection; and
transmitting, to the UE via the eNode B, information indicating that the local IP-based PDN connection is suspended and is not deactivated, if the server managing mobility of the UE determines that suspending the local IP-based PDN connection is supported in a local gateway.

20. The method as claimed in claim 19, wherein the indication information is provided to the eNode B together with a message allowing the CS-based voice service to the UE.

21. The method as claimed in claim 19, wherein the server acquires the indication information from a Domain Name Server (DNS), the local gateway via a serving gateway, or the eNode B, if the server receives a PDN connectivity request from the UE.

22. The method as claimed in claim 19, further comprising suspending a bearer for the local IP-based PDN connection by transmitting the indication information to the local gateway via a serving gateway.

23. A server for supporting local access and voice communication in a wireless network, the server comprising:
a communication interface configured to communicate with network entities; and
a controller configured to:
receive a message for requesting a Circuit Switch (CS)-based voice service from a User Equipment (UE) via an eNode B, the UE having a local Internet Protocol (IP)-based Packet Data Network (PDN) connection, and
transmit, to the UE via the eNode B, information indicating that the local IP-based PDN connection is suspended and is not deactivated, if the server managing mobility of the UE determines that suspending the local IP-based PDN connection is supported in a local gateway.

24. The server as claimed in claim 23, wherein the indication information is provided to the eNode B together with a message allowing the CS-based voice service to the UE.

25. The server as claimed in claim 23, wherein the server is configured to acquire the indication information from a Domain Name Server (DNS), the local gateway via a serving gateway, or the eNode B, if the server receives a PDN connectivity request from the UE.

26. The server as claimed in claim 23, wherein the controller further configured to suspend a bearer for the local IP-based PDN connection by transmitting the indication information to the local gateway via a serving gateway.

* * * * *